(12) United States Patent
Longstreth et al.

(10) Patent No.: US 12,742,511 B2
(45) Date of Patent: Sep. 22, 2026

(54) HOSE WEIGHT

(71) Applicant: Luloh LLC, Harrisburg, PA (US)

(72) Inventors: Lydia Longstreth, Philadelphia, PA (US); Justin Aiello, Kennebun, ME (US)

(73) Assignee: Luloh LLC, Harrisburg, PA (US)

( * ) Notice: Subject to any disclaimer, the term of this patent is extended or adjusted under 35 U.S.C. 154(b) by 322 days.

(21) Appl. No.: 18/645,833

(22) Filed: Apr. 25, 2024

(65) Prior Publication Data

US 2024/0360933 A1 Oct. 31, 2024

Related U.S. Application Data

(60) Provisional application No. 63/461,954, filed on Apr. 26, 2023.

(51) Int. Cl.
*F16L 33/32* (2006.01)
*F16L 1/20* (2006.01)
*F16L 11/00* (2006.01)

(52) U.S. Cl.
CPC ................. *F16L 33/32* (2013.01); *F16L 1/20* (2013.01); *F16L 11/00* (2013.01)

(58) Field of Classification Search
CPC ............... F16L 33/32; F16L 1/20; F16L 11/00
See application file for complete search history.

(56) References Cited

U.S. PATENT DOCUMENTS 5,771,934 A * 6/1998 Warshawsky ............. E03C 1/06 4/678
6,250,338 B1 * 6/2001 Dempsey .................. E03C 1/04 4/678
2018/0328008 A1 * 11/2018 Yan ....................... E03C 1/0404
2022/0268374 A1 * 8/2022 Lu ..................... B29C 45/14073

FOREIGN PATENT DOCUMENTS

CN 212053016 12/2020
CN 215568881 1/2022
CN 217580409 U * 10/2022
GB 2159597 12/1985

OTHER PUBLICATIONS

GB2405822.4 Search Report. Dec. 9, 2024.

* cited by examiner

*Primary Examiner* — Neel Girish Patel
(74) *Attorney, Agent, or Firm* — Joseph E. Maenner; Maenner & Associates, LLC

(57) ABSTRACT

A hose weight has a tubular body extending along a longitudinal axis. The body has a first side, a second side, and a gap extending between the first and second sides. A closure member is configured to engage the first side and the second side across the gap, the closure member rotatable about the longitudinal axis between an open position wherein the gap is exposed and a closed position wherein the gap is covered.

11 Claims, 8 Drawing Sheets

HOSE WEIGHT

BACKGROUND OF THE INVENTION

Field of the Invention

The invention relates to weights that can be attached to the end of a hose to prevent the hose from falling out of a bucket or other receptacle while fluid from the hose is pouring into the receptacle.

Description of the Related Art

Hose weights are known to weight down the end of a hose or other conduit to prevent the end of the hose from falling out of a bucket or other receptacle while fluid is flowing through the hose. These weights tend to be cumbersome, with some requiring tools, such as a screwdriver, to fix the weight onto the hose.

It would be beneficial to provide a simple hose weight that can easily be attached to and removed from the end of a hose.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, the present invention provides a hose weight comprising a tubular body having a first side, a second side, and a gap extending between the first and second sides; and a closure member configured to engage the first side and the second side across the gap.

In an alternative embodiment, the present invention provides a hose weight having a tubular body extending along a longitudinal axis. The body has a first side, a second side, and a gap extending between the first and second sides. A closure member is configured to engage the first side and the second side across the gap, the closure member rotatable about the longitudinal axis between an open position wherein the gap is exposed and a closed position wherein the gap is covered.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
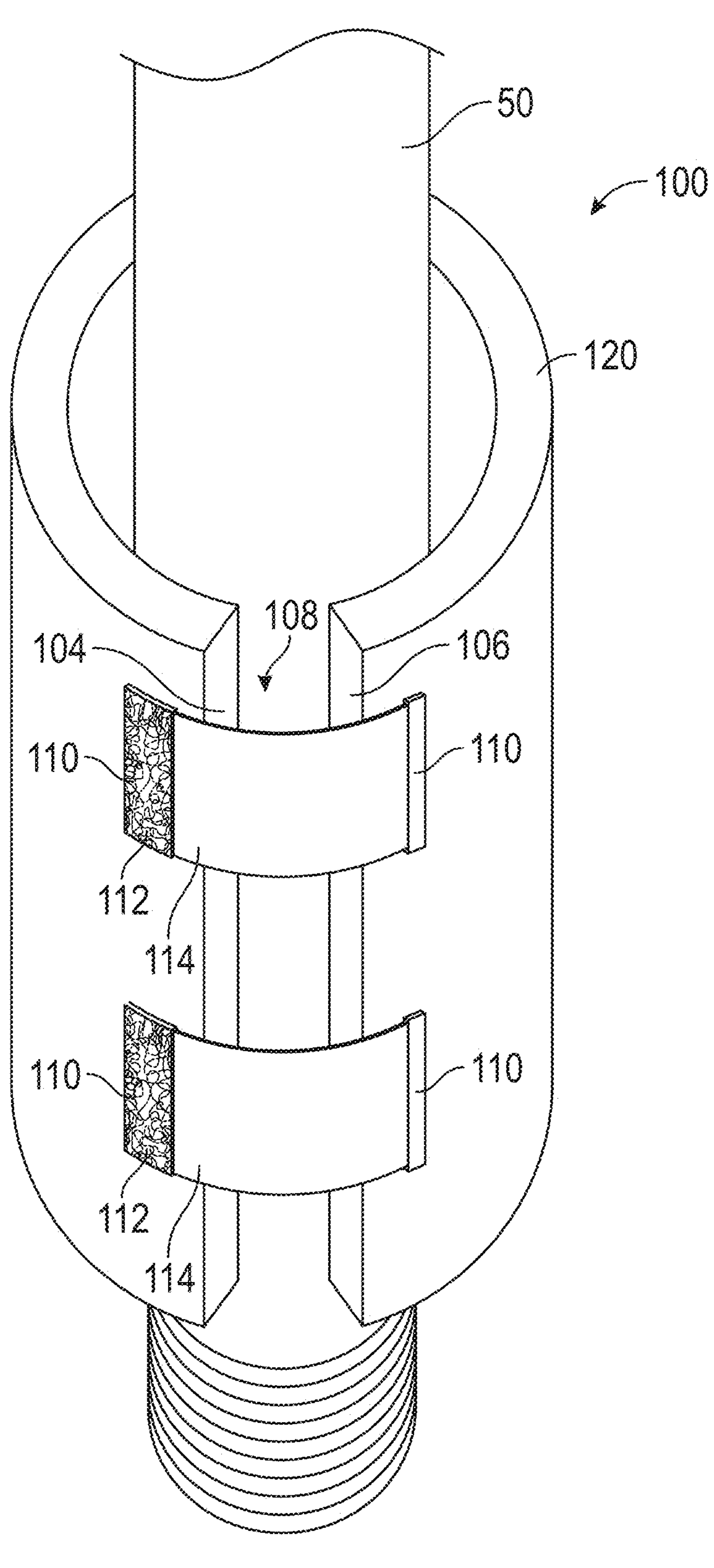
FIG. 1 is a perspective view of a first embodiment of a hose weight according to the present invention attached to a hose.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Several embodiments of hose weights according to the present invention are shown. The weights are designed and constructed to quickly and easily be installed around a hose or other conduit to weigh down the end of the conduit.

Referring to FIG. 1, a first embodiment of a hose weight 100 according to the present invention is shown. As shown in FIG. 1, and by example only, hose weight 100 can be located proximate to a nozzle fitting 52 on the end of a hose 50.

Hose weight 100 includes a generally elongate tubular body 102 constructed from a pliable material, such as rubber or silicone. Body 102 has a first longitudinal side 104 and a second longitudinal side 106, with a gap 108 extending between sides 104, 106. The flexible material that makes up body 102, along with gap 108, allows sides 104, 106 to be spread apart from each other to allow hose 50 to be inserted through gap 108 and inside body 102 to the position shown in FIG. 1.

Side 104 includes a pair of strips 110 for securing first side 104 to second side 106. Strips 110 can include known hook and loop fasteners with one of the hook and loop on an attached end 112 of each strip 110 and the other of the hook and loop on a free end 114 of each strip 110.

Side 106 includes a pair of elongate longitudinal slots 120 that are sufficiently long to allow free end 114 of each strip 110 to be inserted through a respective slot 120 from inside body 102 to extend outside of body 102 and be wrapped back toward first side 104 so that hook and loop fasteners can engage each other and releasably secure free end 114 of strip 110 to attached end 112 of strip 110.

With strips 110 outside of slots 120, hose 50 is inserted through gap 108 to the position shown in FIG. 1. Free ends 114 of strips 110 are fed through slots 120 and wrapped back toward attached end 112 of each strip 110 and pressed against attached end 112 of strips 110 to engage hook and lop fastener and secure hose 50 within hose weight 100. To remove hose 50 from hose weight 100, free ends 114 of strips 110 are pulled from attached ends 112 and strips 110 are each pulled through their respective slots 120 to disengage strips 110 from slots 120. Sides 104, 106 of body 102 are pulled apart, enlarging gap 108 and hose 50 is then pulled from hose weight 100 through gap 108.

Figure 2:
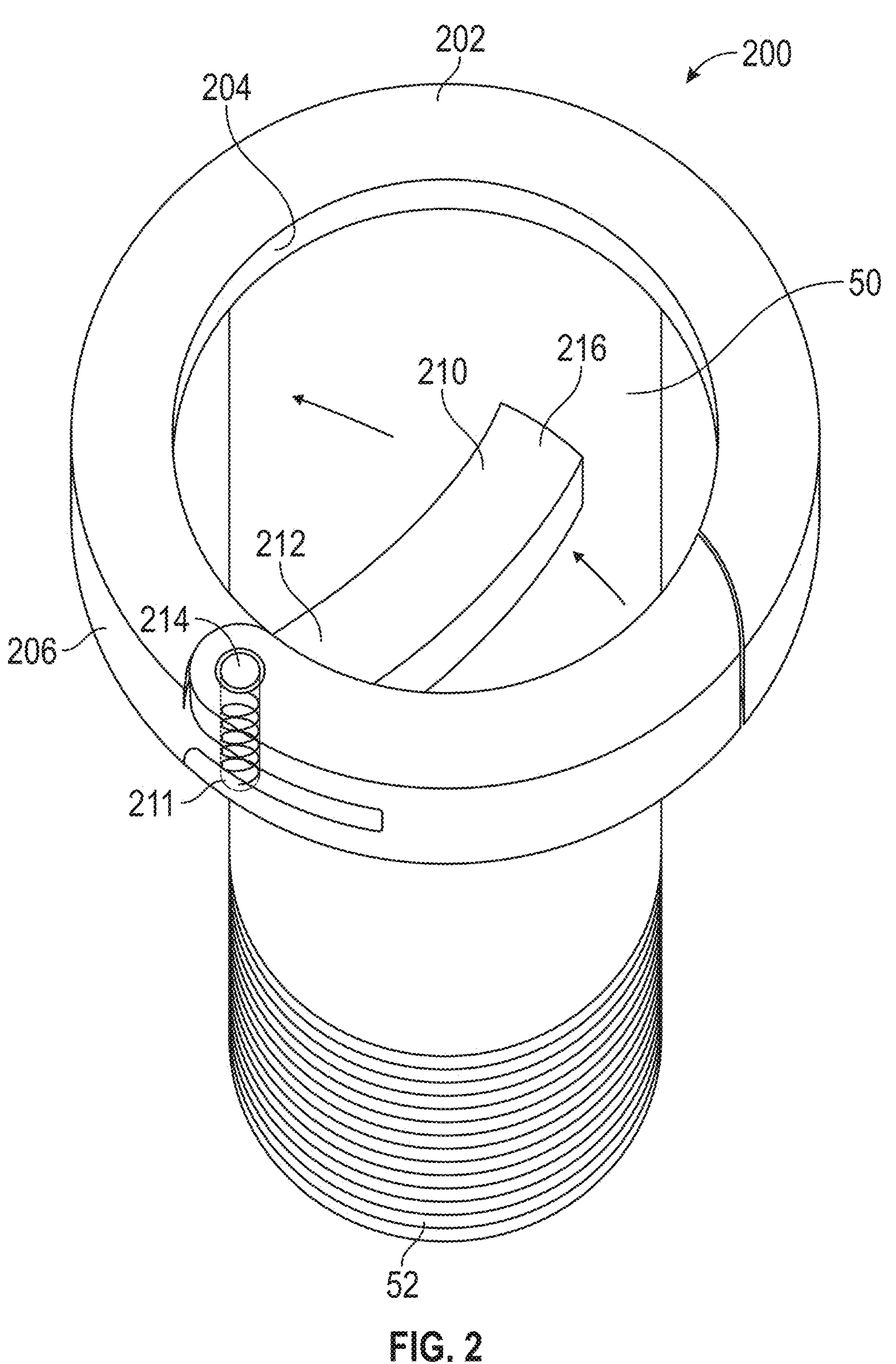
FIG. 2 is a perspective view of a second embodiment of a hose weight according to the present invention attached to a hose.

Referring to FIG. 2, a second embodiment of a hose weight 200 according to the present invention is shown. As shown in FIG. 2, and by example only, hose weight 200 can be located proximate to nozzle fitting 52 on the end of hose 50.

Hose weight 200 includes a generally annular body 202 constructed from a rigid material, such as steel or brass. Body 202 has an inner diameter 204 and an outer diameter 206.

Body 202 includes a locking lever 210 that has a pivot end 212 pivotally attached to body 202 at a pivot point 214. A free end 216 of locking lever 210 can be housed in a cavity (not shown) in body 202 between inner perimeter 205 and outer perimeter 206 when not in use such that locking lever 210 does not extend into the annulus defined by body 202.

In an exemplary embodiment, locking lever 210 can be biased, such as by a biasing member 211 to the position shown in FIG. 2. Alternatively, locking lever 210 can be pivotally attached at pivot point 214 with a tight tolerance fit so that, when locking lever 210 is moved to the position shown in FIG. 2, locking lever 210 does not seek to naturally return to the cavity, but must be acted upon by an outside force to pivot free end 216 of locking lever 210 away from the position shown in FIG. 2 and into the cavity.

To use hose assembly 200, with locking lever 210 housed inside body 202 is slipped over or around nozzle fitting 52 and over hose 50, as shown in FIG. 2. Free end 216 of locking lever 210 is pivoted from inside the cavity to the position shown in FIG. 2 to engage hose 50 and prevent hose weight 200 from falling off hose 50.

Figure 3:
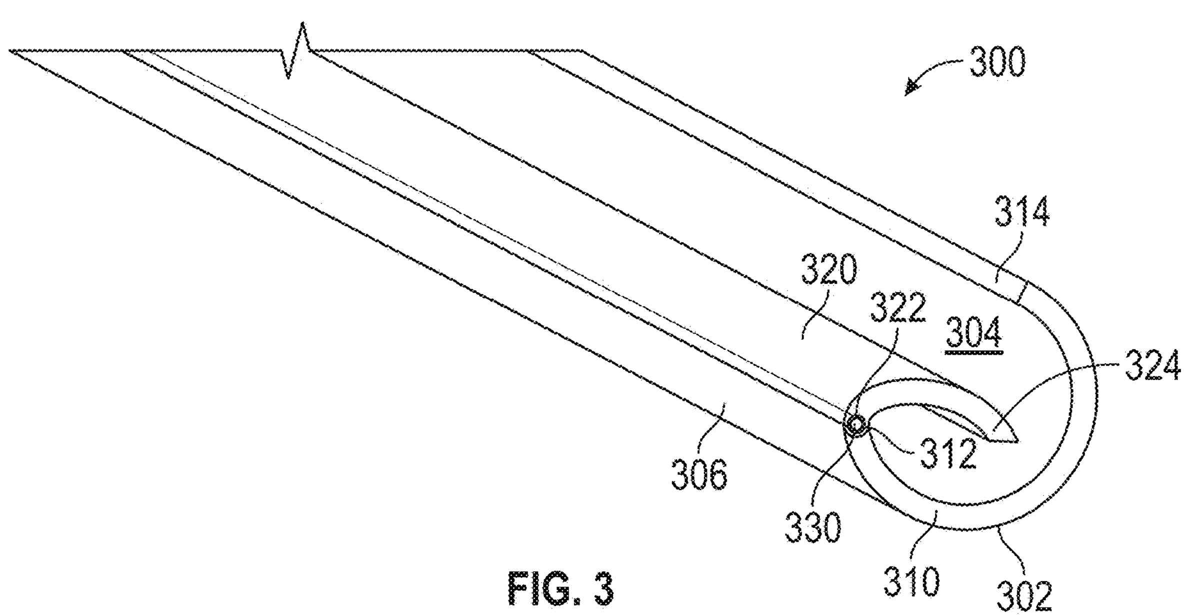
FIG. 3 is a perspective view of a third embodiment of a hose weight according to the present invention.
Figure 3A:
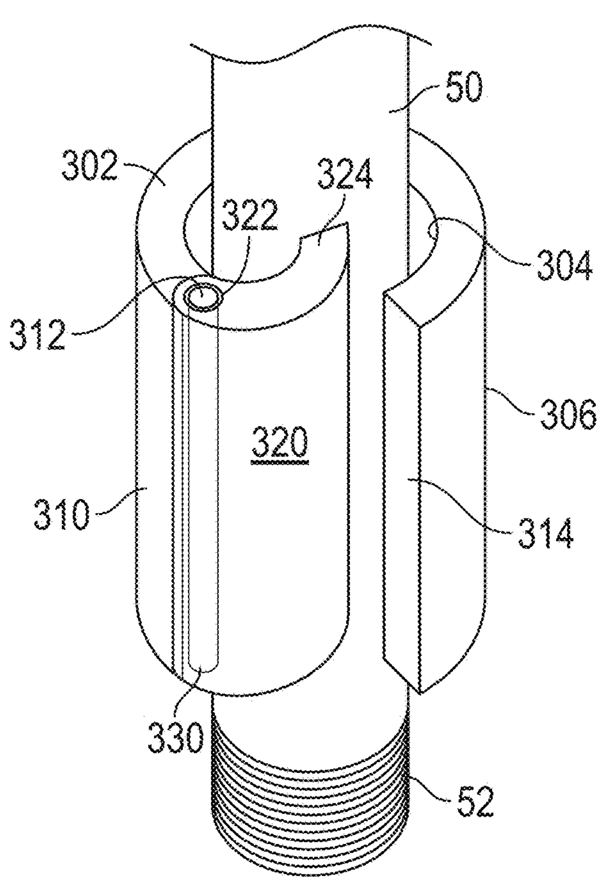
FIG. 3A is a is a perspective view of the hose weight of FIG. 3 attached to a hose.
Figure 4:
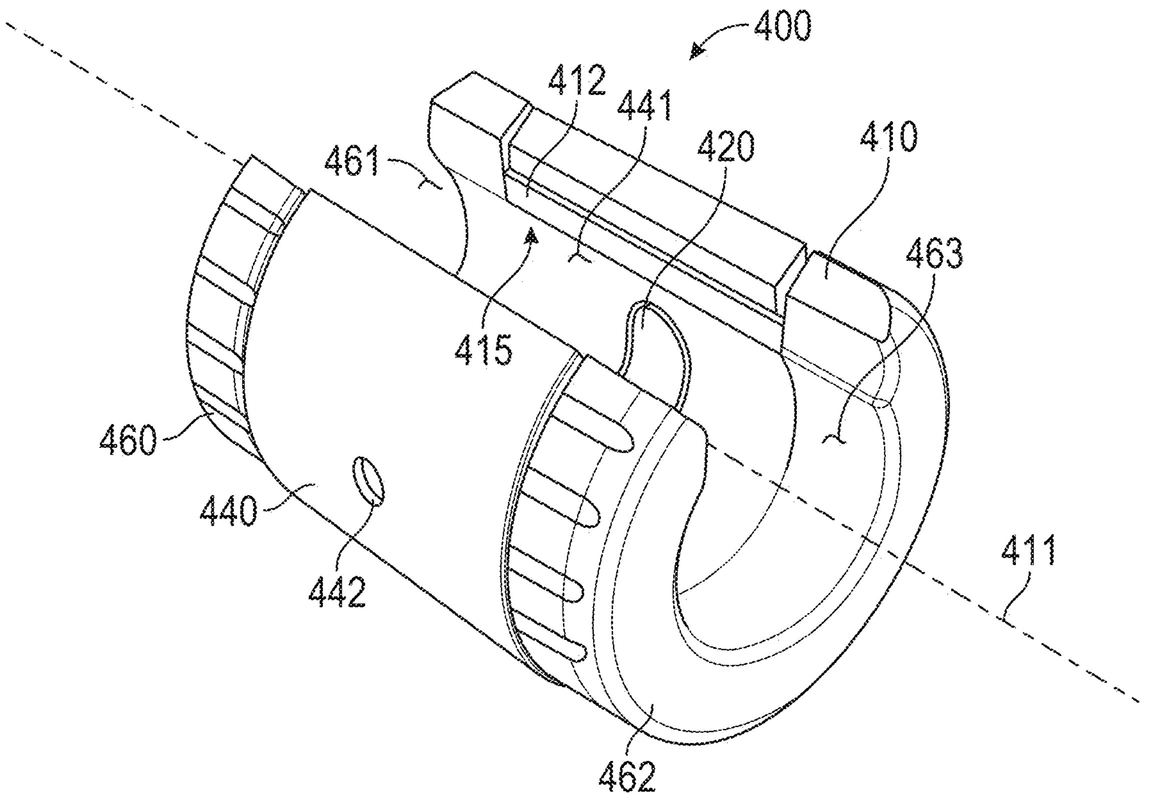
FIG. 4 is a perspective view of a fourth embodiment of a hose weight according to the present invention.
Figure 5:
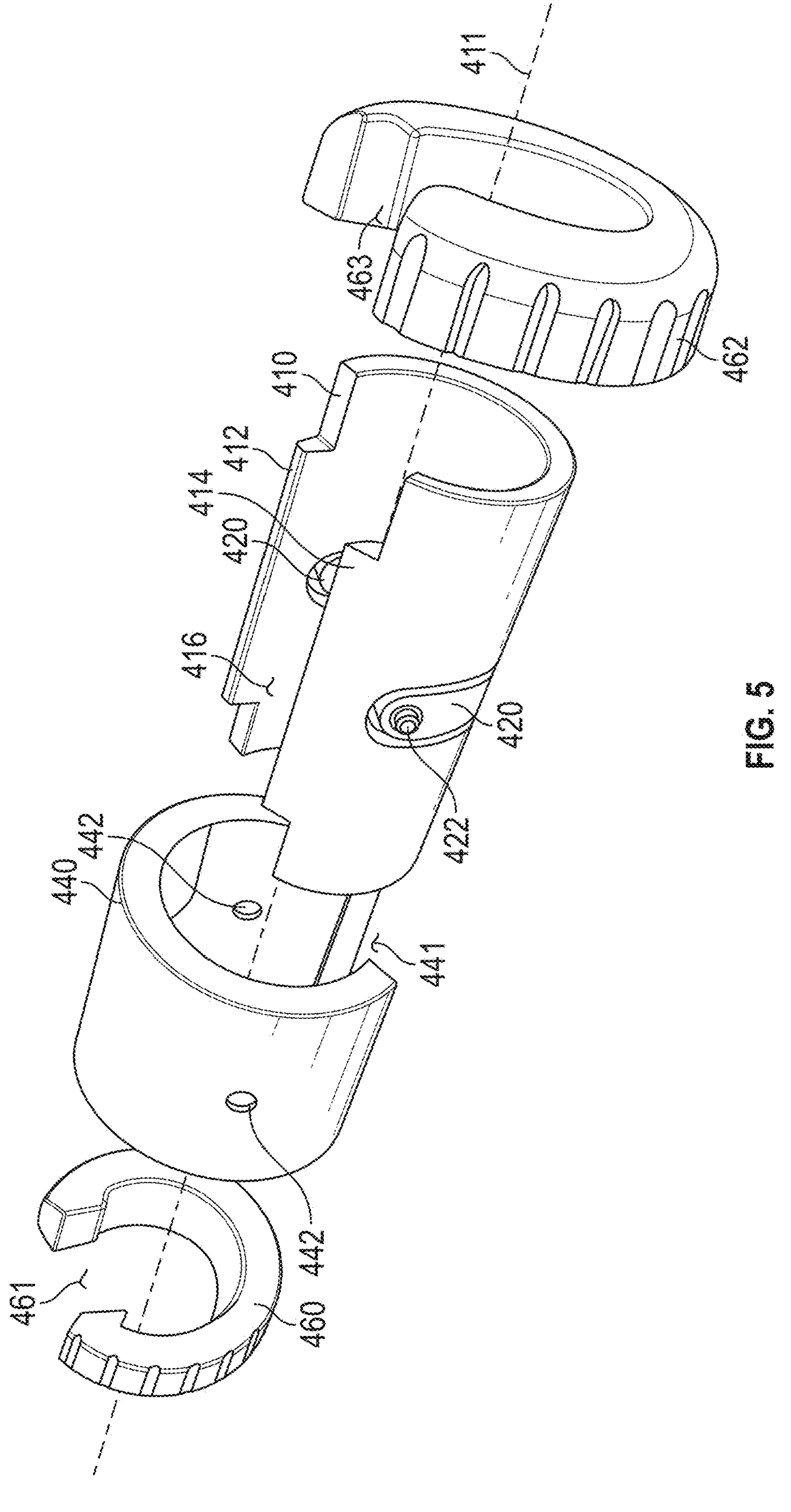
FIG. 5 is an exploded view of the hose weight of FIG. 4.

Referring to FIGS. 3 and 3A, a third embodiment of a hose weight 300 according to the present invention is shown. As shown in FIG. 3A, and by example only, hose weight 300 can be located proximate to nozzle fitting 52 on the end of hose 50.

Hose weight 300 includes a generally elongate tubular body 302 constructed from a rigid material, such as steel or brass. Body 302 has an inner diameter 304 and an outer diameter 306.

Body 302 includes a major body portion 310 that extends in an arc of about 270 degrees and a minor body portion 320 that extends in an arc of about 90 degree. Major body portion 310 has a hinged end 312 and a free end 314. Similarly, minor body portion 320 has a hinged end 322 and a free end 324. Hinged ends 312, 322 are hingedly connected to each other by a hinge 330.

Minor body portion 320 and hinge 330 are configured so that minor body portion 320 can be pivoted between a first position to form tubular body 302, to a second position, as shown in FIGS. 3 and 3A, where free end 324 extends inside of inner diameter 304. Alternatively, hinge 330 can be configured to allow minor body portion 320 to pivot in an outside direction so that free end 324 extends away from the center of weight 300.

Hinge 330 can be a stiff hinge with a tight tolerance fit so that an outside force must be exerted onto minor body portion 320 to pivot minor body portion 320 about hinge 330.

To use hose weight 300, body 302 is slid over or around nozzle fitting 52 and over hose 50, as shown in FIG. 3A. Free end 326 of minor body portion 320 is pivoted from the first position to the position shown in FIG. 3A to engage hose 50 and prevent hose weight 200 from falling off hose 50.

An alternative embodiment of a hose weight 400 is shown in FIGS. 4-8. Hose weight includes a tubular body 410 extending along a longitudinal axis 411. Body 410 has a first side 412, a second side 414, and a gap 416 extending between the first and second sides 412, 414. A closure member 440 is configured to engage the first side 412 and the second side 414 across the gap 416. Closure member 440 is rotatable about the longitudinal axis 411 between an open position wherein the gap 416 is exposed (see FIG. 6) and a closed position wherein the gap 416 is covered (see FIG. 7).

In an exemplary embodiment, body 410 is constructed from a first material, such as a polymer, and the closure member 440 is constructed from a second material, different from the first material, such as a metal (e.g. aluminum, brass), which is denser than the first material. Further, hose weight 400 weighs between one pound and two pounds.

Body 110 includes a pair of diametrically opposing locking members in the form of spring fingers 420 that are diametrically opposed from each other. Each of spring fingers 420 includes a catch, or detent 422.

Closure member 440 has an arcuate cross section with a corresponding gap 441. Closure member 440 has a pair of diametrically opposing locking receivers, or detent catches 442, configured to accept and engage and retain one of the detents 422. In an exemplary embodiment, detent catches 422 are holes or recess in closure member 440. Detent catches 442 each accept and retain a respective detent 422 when the closure member 440 is in the open position. When closure member 440 is rotated to the closed position, each detent catch 442 accepts and retains the other detent 422.

A first end cap 460 is fixedly attached to a first end 430 of the body 410 and a second end cap 462 is fixedly attached to a second, opposing, end 432 of the body 410 such that first and second end caps 460, 462 retain the closure member 440 onto the body 410. Each of the first and second end caps 460, 462 have an end cap gap 461, 463, respectively, aligned with the gap 416 in the body 410.

Gaps 416, 441, 461, 463 are all sized so that a hose 50 (shown in FIGS. 6-8) can be inserted into gaps 416, 441,461, 463. In an exemplary embodiment, an inner diameter of body 410 is about 1¼ inches to be able to accommodate hose 50 having an outer diameter of about 1 inch.

Figure 6:
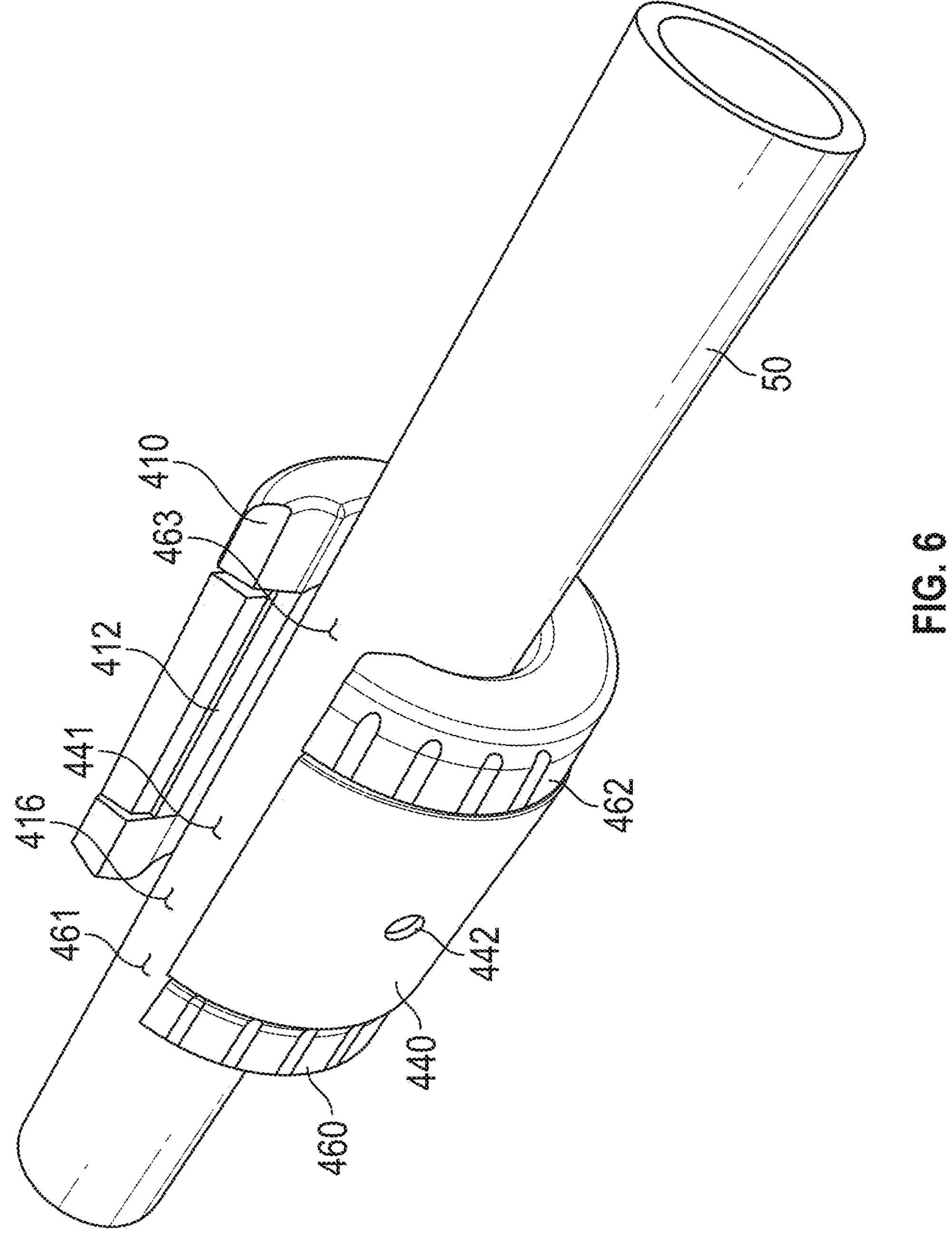
FIG. 6 is a perspective view of the hose weight of FIG. 4 with a hose inserted therein.
Figure 7:
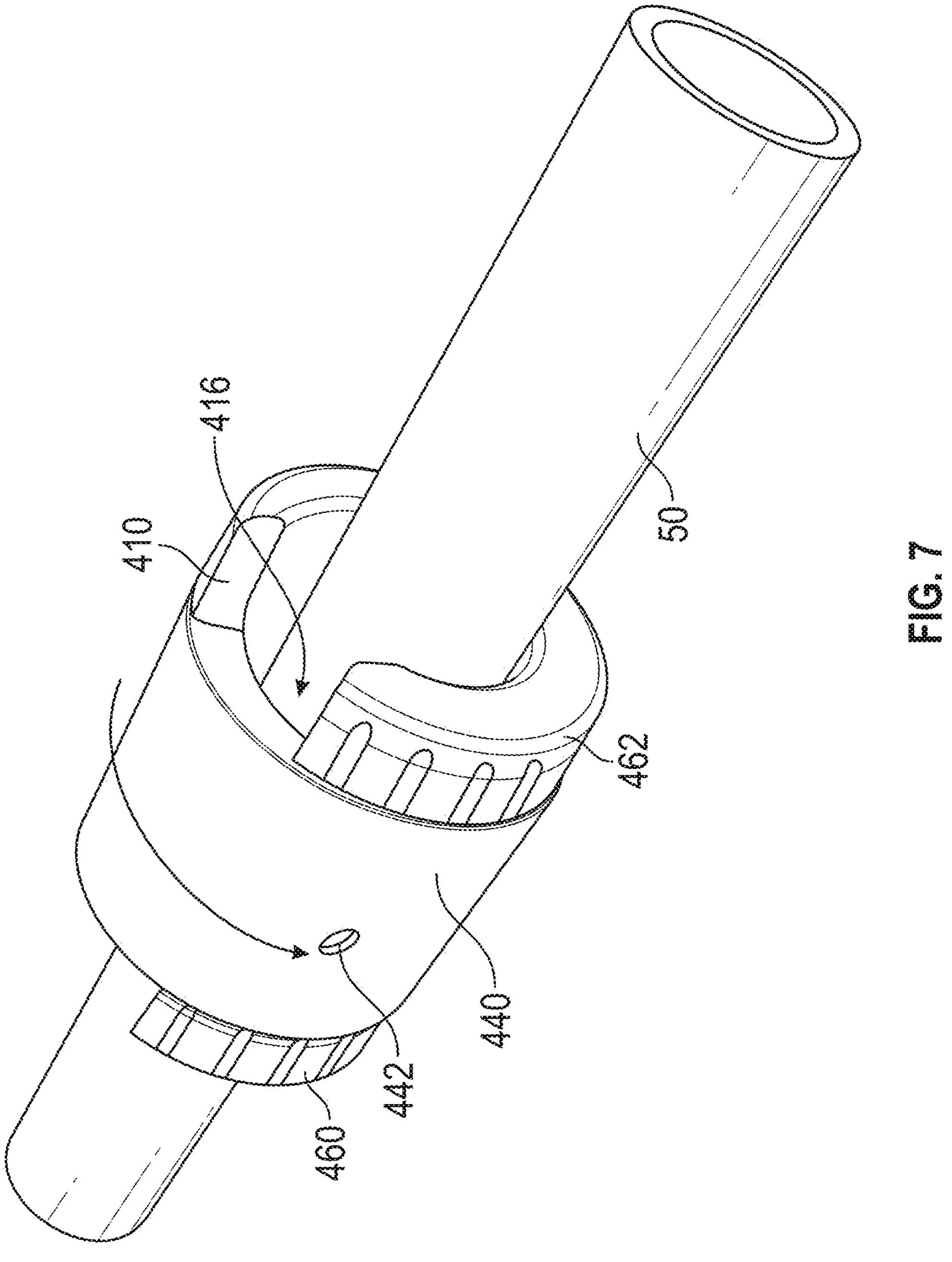
FIG. 7 is a top perspective view of the hose weight and hose of FIG. 6 with a closure member rotated to retain the hose in the hose weight.
Figure 8:
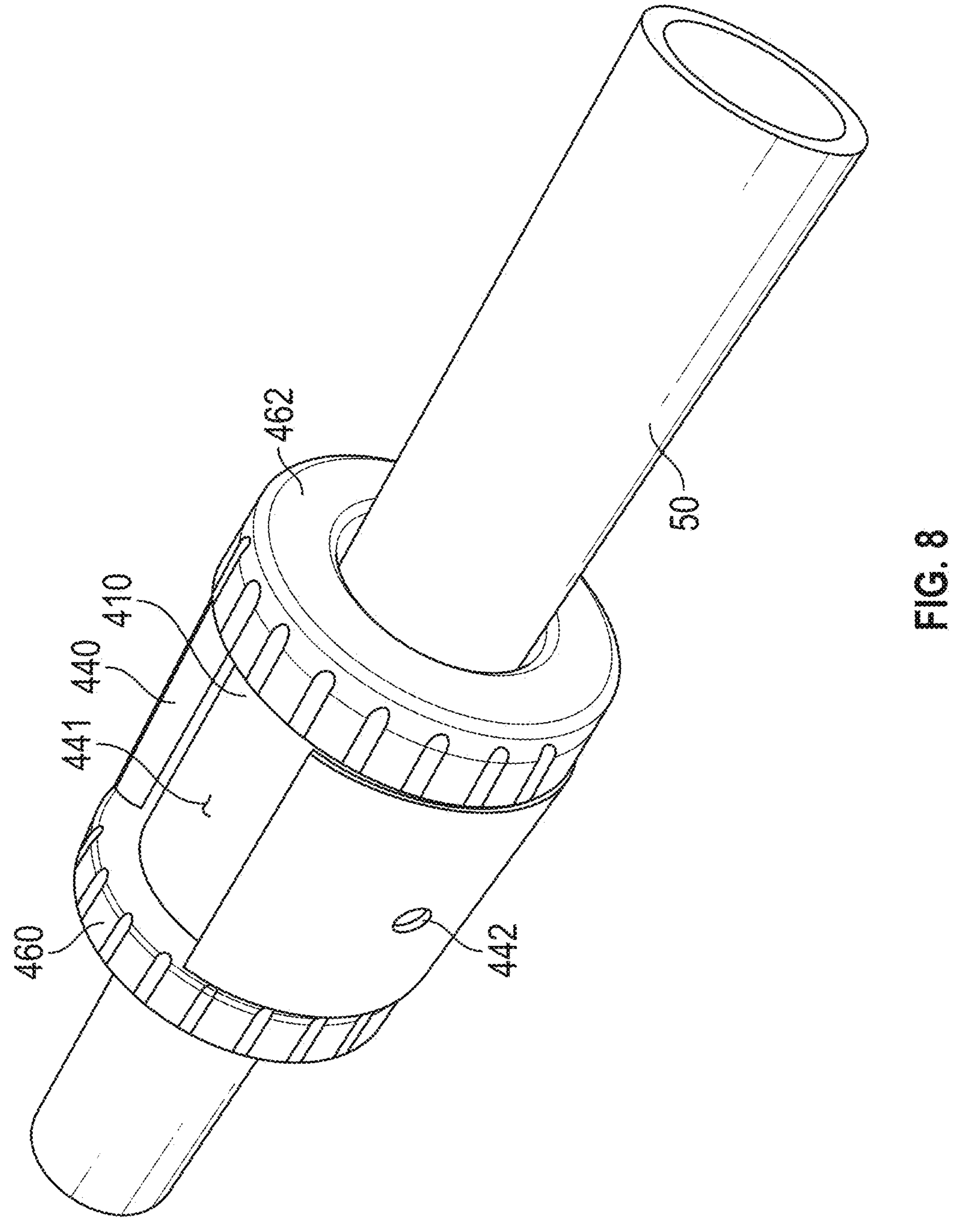
FIG. 8 is a bottom perspective view of the hose weight and hose of FIG. 7.

To use hose weight 400, gaps 416, 441, 461, 463 are all aligned to provide an opening along the length of hose weight 400 so that hose 50 can be inserted thein, as shown in FIG. 6. Closure member 440 is rotated relative to body 410 to force spring fingers 420 inwardly, pulling detents 422 out of their respective detent catches 442, allowing closure member 440 to further rotate over body 410 to the position shown in FIGS. 7 and 8, thereby retaining hose weight 40 onto hose 50. To remove hose weight 400 from hose 50, closure member 440 is rotated relative to body 410 to force spring fingers 420 inwardly, pulling detents 422 out of their respective detent catches 442, allowing closure member 440 to further rotate over body 410 to the position shown in FIG. 6.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A hose weight comprising:

a tubular body extending along a longitudinal axis, the tubular body having a longitudinal gap between a first longitudinal open wall side of the tubular body and a second longitudinal open wall side of the tubular body;

wherein the body comprises a pair of diametrically opposing spring fingers, wherein each of the spring fingers comprises a detent;

a closure member configured to be concentrically rotatably positioned around the tubular body to allow for rotating the closure member between an open position wherein the longitudinal gap is exposed and a closed position wherein the longitudinal gap is covered;

wherein the closure member comprises a pair of diametrically opposing detent catches configured to accept and retain the detents; and wherein the detent catches accept and retain a respective detent when the closure member is in either the open or closed position.

2. The hose weight according to claim 1, further comprising a first end cap attached to a first end of the body and a second end cap attached to a second end of the body.

3. The hose weight according to claim 2, wherein the first and second end caps retain the closure member onto the body.

4. The hose weight according to claim 2, wherein each of the first and second end caps have an end cap gap aligned with the gap in the body.

5. The hose weight according to claim 1, wherein the body is constructed from a first material and the closure member is constructed from a second material, different from the first material.

6. The hose weight according to claim 5, wherein the second material is denser than the first material.

7. The hose weight according to claim 1, further comprising end caps fixed on opposing ends of the body, the end caps configured to retain the closure member onto the body.

8. The hose weight according to claim 1, wherein the closure member has an arcuate cross section.

9. The hose weight according to claim 1, wherein the body comprises a polymer.

10. The hose weight according to claim 1, wherein the closure member comprises a metal.

11. The hose weight according to claim 1, wherein the hose weight weighs between one pound and two pounds.

* * * * *